US012794637B2

(12) United States Patent
Zhu et al.

(10) Patent No.: US 12,794,637 B2
(45) Date of Patent: Nov. 10, 2026

(54) NETWORK-CONFIGURED TRAINING PROCEDURE

(71) Applicant: QUALCOMM Incorporated, San Diego, CA (US)

(72) Inventors: Xipeng Zhu, San Diego, CA (US); Rajeev Kumar, San Diego, CA (US); Shankar Krishnan, San Diego, CA (US); Taesang Yoo, San Diego, CA (US); Mutaz Zuhier Afif Shukair, San Diego, CA (US); Gavin Bernard Horn, La Jolla, CA (US); Aziz Gholmieh, Del Mar, CA (US); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 687 days.

(21) Appl. No.: 17/247,574

(22) Filed: Dec. 16, 2020

(65) Prior Publication Data

US 2022/0190990 A1 Jun. 16, 2022

(51) Int. Cl.
*H04L 5/00* (2006.01)
*G06N 3/08* (2023.01)
(Continued)

(52) U.S. Cl.
CPC ............ *H04L 5/0053* (2013.01); *G06N 3/08* (2013.01); *G06N 20/00* (2019.01); *H04L 5/001* (2013.01); *H04W 24/02* (2013.01)

(58) Field of Classification Search
None
See application file for complete search history.

(56) References Cited

U.S. PATENT DOCUMENTS 10,039,016 B1 * 7/2018 Larish .................. H04W 24/02
10,728,950 B2 7/2020 Nagaraja et al.
(Continued)

FOREIGN PATENT DOCUMENTS

CN 105830415 A 8/2016
CN 110662238 A 1/2020
(Continued)

OTHER PUBLICATIONS

Dahlman E., et al., "Artificial Intelligence in Future Evolution of Mobile Communication", 2019 International Conference on Artificial Intelligence in Information and Communication (ICAIIC), IEEE, Feb. 11, 2019 (Feb. 11, 2019), pp. 102-106, XP033531788, DOI: 10.1109/ICAIIC.2019.8669012 [retrieved on Mar. 18, 2019] paragraph 3.

(Continued)

*Primary Examiner* — Suk Jin Kang
(74) *Attorney, Agent, or Firm* — QUALCOMM Incorporated

(57) ABSTRACT

Various aspects of the present disclosure generally relate to wireless communication and training a model. In some aspects, a user equipment (UE) may receive, from a base station, configuration information for performing a BS-configured training procedure associated with optimizing a network parameter. The UE may perform the BS-configured training procedure based at least in part on the configuration information. Numerous other aspects are provided.

30 Claims, 7 Drawing Sheets

(51) Int. Cl.
*G06N 20/00* (2019.01)
*H04W 24/02* (2009.01)

(56) References Cited

U.S. PATENT DOCUMENTS

| | | | | |
|---|---|---|---|---|
| 10,785,101 | B2 * | 9/2020 | Li | H04L 41/0823 |
| 10,966,097 | B2 * | 3/2021 | Al-Fanek | H04W 74/0816 |
| 11,030,484 | B2 * | 6/2021 | Walters | G06F 16/9536 |
| 11,109,283 | B1 * | 8/2021 | Kulkarni | H04W 36/0083 |
| 11,948,074 | B2 * | 4/2024 | Jung | G06N 3/04 |
| 12,269,462 | B1 * | 4/2025 | Garimella | G06N 3/08 |
| 2019/0045370 | A1 | 2/2019 | Al-Fanek et al. | |
| 2019/0068443 | A1 * | 2/2019 | Li | H04L 41/0816 |
| 2019/0110319 | A1 | 4/2019 | Tokgoz et al. | |
| 2020/0100160 | A1 | 3/2020 | Pandey et al. | |
| 2020/0145951 | A1 * | 5/2020 | O'Shea | G06N 3/045 |
| 2020/0167691 | A1 * | 5/2020 | Golovin | G06N 7/01 |
| 2020/0175161 | A1 * | 6/2020 | Giaconi | G06N 3/084 |
| 2020/0302234 | A1 * | 9/2020 | Walters | G06K 9/6276 |
| 2020/0366340 | A1 * | 11/2020 | Zhang | G06N 3/08 |
| 2020/0366557 | A1 * | 11/2020 | Chi | H04W 24/06 |
| 2021/0021491 | A1 * | 1/2021 | Pasha | G06F 11/323 |
| 2021/0037394 | A1 * | 2/2021 | Wainer | G06N 20/00 |
| 2021/0043306 | A1 * | 2/2021 | Cheng | G06V 10/764 |
| 2021/0110302 | A1 * | 4/2021 | Nam | G06N 5/01 |
| 2021/0232981 | A1 * | 7/2021 | Sundaresan | H04L 63/0823 |
| 2021/0235293 | A1 * | 7/2021 | Chen | H04W 24/08 |
| 2021/0241090 | A1 * | 8/2021 | Chen | H04W 24/08 |
| 2021/0256422 | A1 * | 8/2021 | Unterthiner | G06F 18/24137 |
| 2021/0266774 | A1 * | 8/2021 | Han | H04W 24/10 |
| 2021/0279566 | A1 * | 9/2021 | Lin | G06F 18/23 |
| 2021/0287048 | A1 * | 9/2021 | Walters | G06N 20/00 |
| 2021/0287079 | A1 * | 9/2021 | Poli | G06N 3/0675 |
| 2021/0295168 | A1 * | 9/2021 | Xu | G06F 17/18 |
| 2021/0295191 | A1 * | 9/2021 | Bui | G06V 10/751 |
| 2021/0303988 | A1 * | 9/2021 | Kaplan | G06N 3/084 |
| 2021/0337393 | A1 * | 10/2021 | Wainer | H04W 16/18 |
| 2021/0338007 | A1 * | 11/2021 | Choi | G05B 19/042 |
| 2021/0374540 | A1 * | 12/2021 | Yuan | G06N 10/00 |
| 2021/0374610 | A1 * | 12/2021 | Dirac | G06N 20/00 |
| 2021/0385682 | A1 * | 12/2021 | Bedekar | H04W 28/0215 |
| 2022/0021469 | A1 * | 1/2022 | Veijalainen | H04B 17/15 |
| 2022/0046433 | A1 * | 2/2022 | Bedekar | H04W 76/10 |
| 2022/0058524 | A1 * | 2/2022 | Kudinov | G06N 20/00 |
| 2022/0066526 | A1 * | 3/2022 | Hong | G06F 1/266 |
| 2022/0150760 | A1 * | 5/2022 | Balasubramanian | H04W 28/0268 |
| 2022/0174634 | A1 * | 6/2022 | O'Shea | G06N 3/047 |
| 2022/0182802 | A1 * | 6/2022 | Pezeshki | H04W 72/21 |
| 2022/0188688 | A1 * | 6/2022 | Launay | G06N 20/00 |
| 2022/0208357 | A1 * | 6/2022 | Cheng | G06F 18/214 |
| 2022/0261634 | A1 * | 8/2022 | Liu | G06N 3/08 |
| 2022/0279341 | A1 * | 9/2022 | Tomala | G06N 20/00 |
| 2022/0322107 | A1 * | 10/2022 | Wang | G06N 3/08 |
| 2022/0353155 | A1 * | 11/2022 | Ma | H04W 28/18 |
| 2022/0414465 | A1 * | 12/2022 | Toizumi | G06N 3/048 |
| 2023/0086727 | A1 * | 3/2023 | Konishi | G06N 3/048<br>706/15 |
| 2023/0092453 | A1 * | 3/2023 | Wang | G06V 20/58<br>706/15 |
| 2023/0206072 | A1 * | 6/2023 | Xu | G06N 3/045<br>706/21 |
| 2023/0215159 | A1 * | 7/2023 | Deng | G06V 10/82<br>382/157 |
| 2023/0267326 | A1 * | 8/2023 | Jiang | G06N 3/08<br>706/25 |
| 2023/0297882 | A1 * | 9/2023 | Pantelidou | G06F 9/5044<br>706/12 |
| 2023/0336340 | A1 * | 10/2023 | Polleri | G06F 11/3003 |
| 2024/0004710 | A1 * | 1/2024 | Cao | G06N 20/00 |

FOREIGN PATENT DOCUMENTS

| | | | | | |
|---|---|---|---|---|---|
| CN | 110691330 | A | | 1/2020 | |
| EP | 3739929 | A1 | | 11/2020 | |
| WO | 2018039427 | | | 3/2018 | |
| WO | 2020048594 | A1 | | 3/2020 | |
| WO | WO-2020064134 | A1 | | 4/2020 | |
| WO | WO-2020122669 | A1 | * | 6/2020 | G06N 20/00 |
| WO | 2020234902 | A1 | | 11/2020 | |
| WO | WO-2021007019 | A1 | * | 1/2021 | H04W 24/10 |

OTHER PUBLICATIONS

International Search Report and Written Opinion—PCT/US2021/072752—ISA/EPO—Mar. 25, 2022.

* cited by examiner

NETWORK-CONFIGURED TRAINING PROCEDURE

FIELD OF THE DISCLOSURE

Aspects of the present disclosure generally relate to wireless communication and to techniques and apparatuses associated with a network-configured training procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, configuration information for performing a BS-configured training procedure associated with optimizing a network parameter; and performing the BS-configured training procedure based at least in part on the configuration information.

In some aspects, a method of wireless communication performed by a base station includes receiving, from a server, a request to perform a server-requested training procedure associated with optimizing a network parameter; and performing the server-requested training procedure based at least in part on receiving the request.

In some aspects, a UE for training a model includes a memory; and one or more processors operatively coupled to the memory, the memory and the one or more processors configured to: receive, from a base station, configuration information for performing a BS-configured training procedure associated with optimizing a network parameter; and perform the BS-configured training procedure based at least in part on the configuration information.

In some aspects, a base station for wireless communication includes a memory; and one or more processors operatively coupled to the memory, the memory and the one or more processors configured to: receive, from a server, a request to perform a server-requested training procedure associated with optimizing a network parameter; and perform the server-requested training procedure based at least in part on receiving the request.

In some aspects, a non-transitory computer-readable medium storing a set of instructions for training a model includes one or more instructions that, when executed by one or more processors of a UE, cause the UE to: receive, from a base station, configuration information for performing a BS-configured training procedure associated with optimizing a network parameter; and perform the BS-configured training procedure based at least in part on the configuration information.

In some aspects, a non-transitory computer-readable medium storing a set of instructions for wireless communication includes one or more instructions that, when executed by one or more processors of a base station, cause the base station to: receive, from a server, a request to perform a server-requested training procedure associated with optimizing a network parameter; and perform the server-requested training procedure based at least in part on receiving the request.

In some aspects, an apparatus for training a model includes means for receiving, from a base station, configuration information for performing a BS-configured training procedure associated with optimizing a network parameter; and means for performing the BS-configured training procedure based at least in part on the configuration information.

In some aspects, an apparatus for wireless communication includes means for receiving, from a server, a request to perform a server-requested training procedure associated with optimizing a network parameter; and means for performing the server-requested training procedure based at least in part on receiving the request.

Aspects generally include a method, apparatus, system, computer program product, non-transitory computer-readable medium, user equipment, base station, transmitter, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
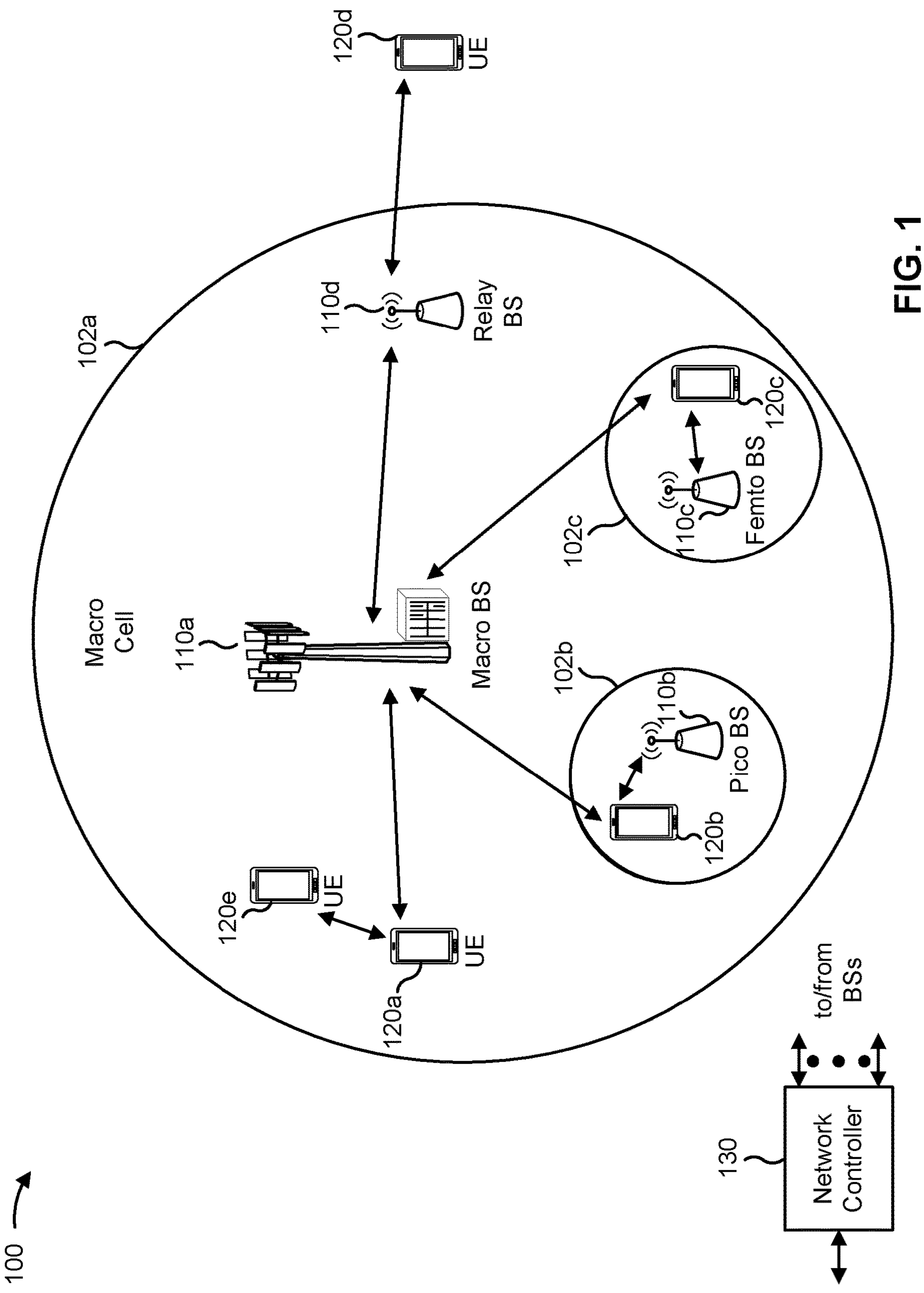
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
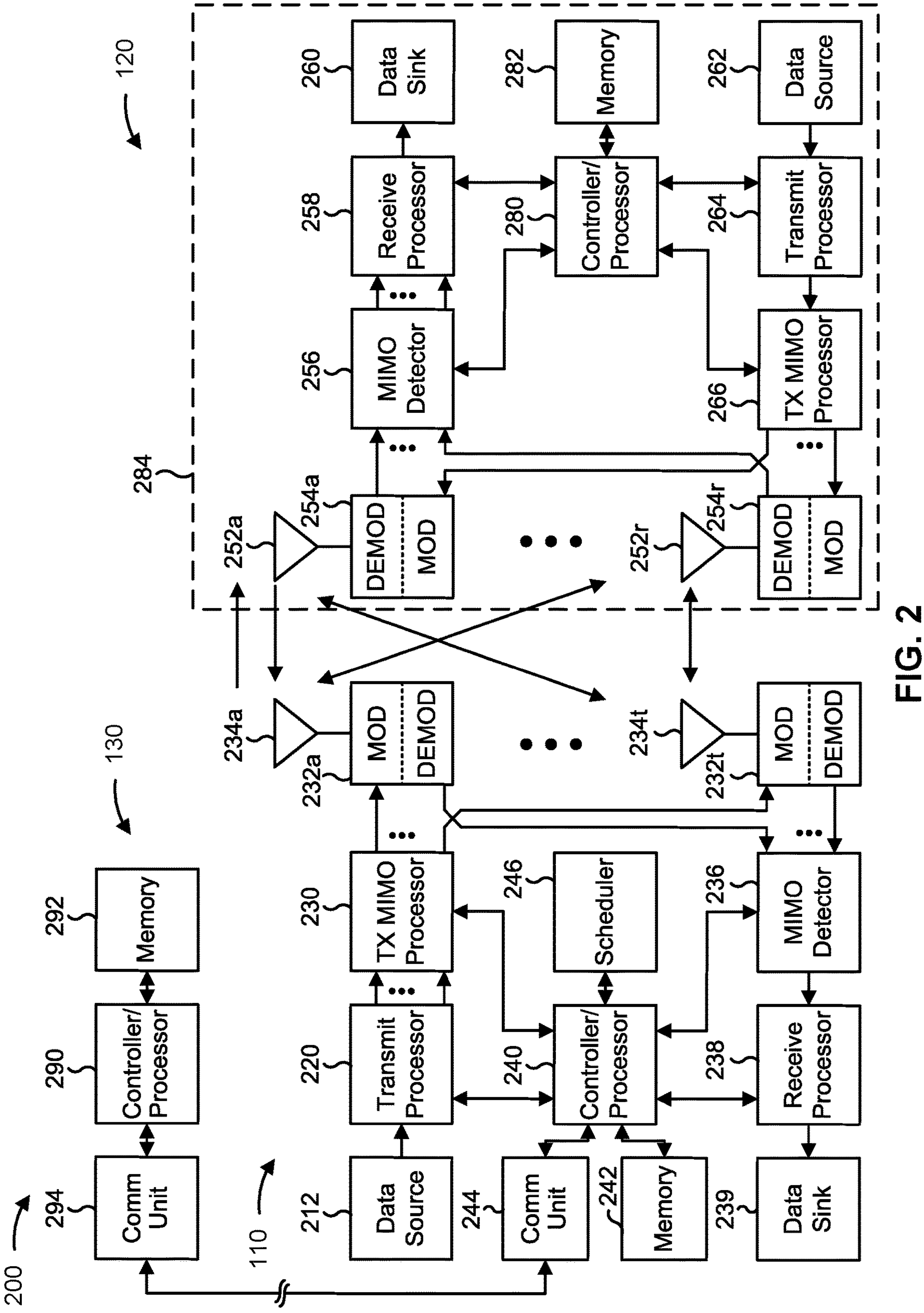
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with a network-configured training procedure, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, a UE (e.g., UE 120) includes means for receiving, from a base station, configuration information for performing a BS-configured training procedure associated with optimizing a network parameter; and means for performing the BS-configured training procedure based at least in part on the configuration information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for providing, to the base station, a report associated with performing the BS-configured training procedure based at least in part on receiving a trigger or a request to provide the report.

In some aspects, a base station (e.g., BS 110) includes means for receiving, from a server, a request to perform a server-requested training procedure associated with optimizing a network parameter; and means for performing the server-requested training procedure based at least in part on receiving the request. In some aspects, the means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting, to the server, a result associated with performing the server-requested training procedure.

In some aspects, the base station includes means for transmitting, to a UE, configuration information associated with performing a BS-configured training procedure based at least in part on a capability of the UE to perform the BS-configured training procedure.

In some aspects, the base station includes means for transmitting, to one or more UEs, respective configuration information associated with performing respective BS-configured training procedures; or means for receiving, from the one or more UEs, respective reports associated with performing the respective BS-configured training procedures.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A wireless network such as an LTE network or a 5G/NR network (e.g., the network) may include a plurality of base stations conducting data communication with a plurality of UEs. A network provider may manage the network by managing operations, administration, and maintenance (OAM) of the network. The network provider may utilize an OAM server to manage the network and improve network performance. The OAM server may manage the network by, for example, managing a measure of coverage provided in the network, managing handover procedures, updating network procedures, introducing new services, troubleshooting reported issues, or the like. To improve the network performance, the OAM server may collect data from the plurality of UEs and the plurality of base stations. The OAM server may process the collected data to identify areas of improvement and/or issues and implement solutions to improve the network performance.

Collecting (e.g., receiving) data from each of the plurality of UEs and each of the plurality of base stations may be onerous as the collecting may utilize network resources that could otherwise be used for other network operations. For instance, collecting data from each the plurality of UEs and the plurality of base stations may utilize network bandwidth (e.g., frequency and/or time resources) that could otherwise be used for communication in the network. Additionally, an amount of the collected data may be sizeable and may consume OAM server resources (e.g., memory storage, processing capability, or the like) that could be used to perform other OAM tasks. As such, the collection of data may be infeasible. Further, the collected data may include private information associated with users of the plurality of UEs. Such private information may have to be collected and/or stored in a secure manner, thereby making the collection and processing of the data expensive. As a result, collection and processing of data by the OAM server to improve the network performance may be infeasible and expensive.

Various aspects of techniques and apparatuses described herein are associated with a network-configured training procedure, which may enable convenient and cost-effective processing of data associated with a plurality of UEs conducting data communication with a plurality of base stations in a network. In some aspects, the network-configured training procedure may enable a distributed processing of the data by the plurality of UEs and the plurality of base stations. For instance, the OAM server may request a base station, from among the plurality of base stations, to perform a server-requested training procedure and provide results to be utilized by the OAM server to improve the network performance. In turn, the base station may request one or more UEs, from among the plurality of UEs, to perform respective base station-configured training procedures and provide respective results, which the base station may use to perform the server-requested training procedure. As a result, the network-configured training procedure may yield results that the OAM server may use to improve the network performance without the OAM server undertaking infeasible and expensive collection of data. In this way, the network-configured training procedure may enable a convenient and cost-effective way to improve the network performance.

In some aspects, a UE (e.g., UE 120) may receive, from a base station (e.g., BS 110), configuration information for performing a BS-configured training procedure associated with optimizing a network parameter; and may perform the BS-configured training procedure based at least in part on the configuration information. In some aspects, a base station may receive, from a server, a request to perform a server-requested training procedure associated with optimizing a network parameter; and may perform the server-requested training procedure based at least in part on receiving the request.

Figure 3:
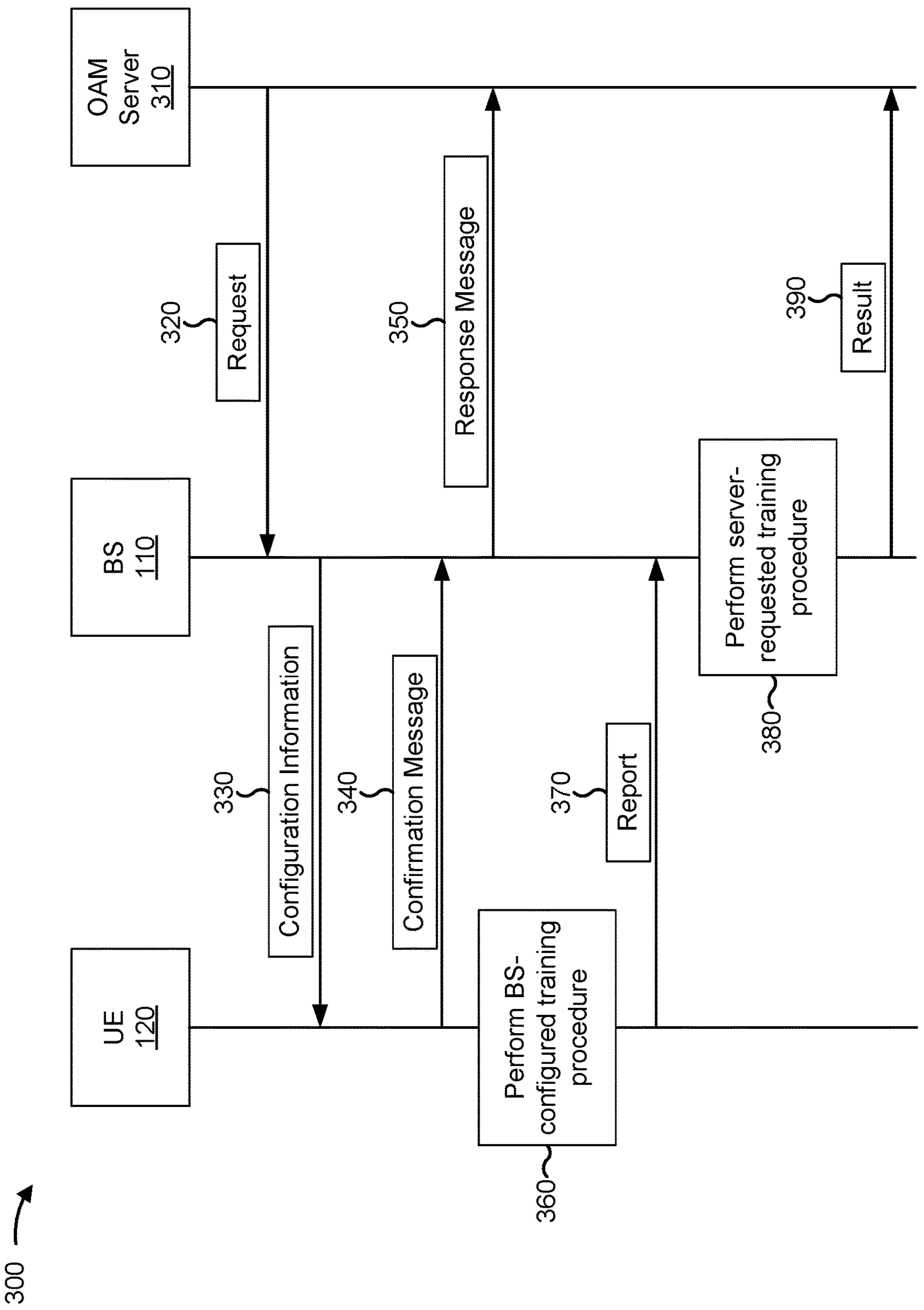
FIG. 3 is a diagram illustrating an example associated with a network-configured training procedure, in accordance with various aspects of the present disclosure.

FIG. 3 is a diagram illustrating an example 300 associated with a network-configured training procedure, in accordance with various aspects of the present disclosure. FIG. 3 shows a UE 120 and a BS 110 conducting data communication in, for example, an LTE network or a 5G/NR network. The data communication may include downlink communications from the BS 110 to the UE 120 and may include uplink communications from the UE 120 to the BS 110. In some aspects, the downlink communications and uplink communications may include information associated with the network-configured training procedure.

The BS 110 may be in communication with an OAM server 310, deployed by a network provider of the LTE network or the 5G/NR network (e.g., the network). In some instances, the OAM server 310 may include, or be included within, an Access and Mobility Management Function (AMF) server. The OAM server 310 may manage the network to assist the network provider by managing operations, administration, and maintenance of the network, and by improving network performance. In some aspects, the OAM server 310 may manage the network by, for example, managing a measure of coverage provided in the network, managing handover procedures, updating network procedures, introducing new services, troubleshooting reported issues, or the like. To improve the network performance, the OAM server 310 may, for example, identify areas of improvement and/or issues and implement solutions to improve the network performance. In some aspects, the OAM server 310 may evaluate a current performance of the network and may improve the current performance.

As shown by reference number 320, the OAM server 310 may transmit, and the BS 110 may receive, a request to perform a server-requested training procedure associated with optimizing a network parameter to improve performance. The network parameter may include, for example, network performance associated with a service (e.g., positioning service) provided to UEs in the network, a measure of coverage to the UEs in the network, a data latency parameter, a download speed parameter, handover services, or the like.

In the request, the OAM server 310 may provide information associated with performing the server-requested training procedure. For instance, when the network parameter may be associated with providing positioning services for the UE 120, the OAM server 310 may provide parameters to be used by the BS 110 in performing the server-requested training procedure. Such parameters may include, for example, a requested geographical area for which the server-requested training procedure is to be performed, a requested measure of accuracy of a result associated with performing the server-requested training procedure, a requested number of training samples to be collected and processed, requested location information, a requested time frame associated with collecting and processing the data, or the like.

In some aspects, as shown by reference number 330, the BS 110 may transmit, and the UE 120 may receive, configuration information associated with performing a BS-configured training procedure. In some aspects, one or more UEs (including UE 120) may be conducting data communication with the BS 110, and the BS 110 may transmit respective configuration information associated with performing respective BS-configured training procedures to the one or more UEs. In other words, the BS 110 may enable distributed processing of data.

In some aspects, the respective configuration information may be based at least in part on respective capabilities of the one or more UEs. For instance, configuration information for a given UE may be based at least in part on whether the given UE is capable of utilizing a machine learning (ML) model to perform the BS-configured training procedure. Additionally, or alternatively, the BS 110 may determine whether the given UE possesses adequate processing capacity, adequate hardware acceleration capacity, adequate memory space, or the like to perform the BS-configured training procedure. In some aspects, the BS 110 may determine capabilities of the one or more UEs based at least in part on inspecting data (e.g., capability bits including verification capability bits and/or interference capability bits) associated with the one or more UEs.

In some aspects, prior to transmitting the configuration information, the BS 110 may determine whether a UE has previously provided consent to performing the BS-configured training procedure. In some aspects, a UE may provide such consent while initially establishing a connection with the BS 110. In some aspects, a UE may provide such consent while signing up to obtain services from the network provider. In this case, the OAM server 310 may indicate, in the request, information regarding UEs that have provided such consent. In some aspects, the BS 110 may refrain from transmitting configuration information associated with performing the BS-configured training procedure to a UE that has not previously provided such consent.

The configuration information may be received at a beginning of and/or during the data communication. In some aspects, the UE 120 may receive the configuration information via, for example, a control channel (e.g., a physical downlink control channel (PDCCH)) between the UE 120 and the BS 110. The configuration information may be received via radio resource control (RRC) signaling, medium access control (MAC) signaling, downlink control information (DCI) signaling, or a combination thereof (e.g., RRC configuration of a set of values for a parameter and DCI indication of a selected value of the parameter).

In some aspects, the configuration information may include an indication of, for example, one or more configuration parameters for the UE 120 to use to configure the UE 120 for the data communication and/or to perform the BS-configured training procedure. For instance, the configuration information may include model information (e.g., training information, reporting information, or the like) to be utilized and/or evaluated by the UE 120 while performing the BS-configured training procedure. In some aspects, performing the BS-configured training procedure may include utilizing a ML model (e.g., algorithm), and the model information may include, for example, initial weights associated with initial parameters provided to the ML model as input data for evaluation. For instance, as discussed below in further detail, the model information may include a model definition including a node list for one or more training layers and initial weights associated with the one or more training layers.

In the example related to improving provision of positioning services, the initial parameters may include location data associated with movement of the UE 120, angle of arrival data associated with signals received by the UE 120, measure of quality associated with radio signaling data, or the like. In some aspects, the UE 120 may measure supporting data associated with the initial parameters in real-time while performing the BS-configured training procedure. In some aspects, the UE 120 may obtain the supporting data associated with the initial parameters from an internal memory (e.g., memory 282) storing, for example, a movement history of the UE 120.

The model information may also include parameters associated with one or more actions to be carried out while performing the BS-configured training procedure. For instance, the model information may include training information regarding updating the initial weights based at least in part on output data provided by the ML model. In some aspects, the information regarding updating the initial weights may include information regarding a frequency with which to update the initial weights, a timeframe within which to update the initial weights, or the like. The model information may also include information regarding a method to be used to verify a measure of accuracy with respect to a configured error level. For instance, the model information may indicate that the UE 120 is to use a mean squared error (MSE) method $$\left(MSE = \sum_{n=1}^{N} |Y - f(X)|^2,\right.$$

where N is a number of samples, Y is a known output, and X is a known input) to verify whether a measure of accuracy associated with updated weights fails to satisfy the configured error level (e.g., the measure of accuracy is equal to or greater than the configured error level). In some aspects, the model information may indicate that the UE 120 is to update the initial weights when, for example, the measure of accuracy associated with updated weights fails to satisfy the configured error level.

In some aspects, the model information may include information associated with a configured area for which the BS-configured training procedure is to be performed by the UE 120. In some aspects, the configured area may be based at least in part on the requested area, indicated by the OAM server 310. For instance, the requested area may include an area of a cell being served by the BS 110. Based at least in part on the area of the cell, the BS 110 may determine the configured area to be a portion of the area of the cell for which the BS-configured training procedure is to be performed by the UE 120. Additionally, or alternatively, based at least in part on the area of the cell, the BS 110 may determine another configured area to be another portion of the area of the cell for which another BS-configured training procedure is to be performed by another UE. In some aspects, the configured area may be based at least in part on a cell list, a public land mobile network (PLMN) list, a RAN notification area (RNA) list, and/or a tracking area identity (TAI) list.

In some aspects, the model information may include information associated with starting and/or stopping (e.g., completing) performance of the BS-configured training procedure. For instance, the model information may include a time when the UE 120 is to start performing the BS-configured training procedure, a time when the UE 120 is to stop (e.g., complete) performing the BS-configured training procedure, and/or a timeframe within which the UE 120 is to complete performing the BS-configured training procedure. In some aspects, the model information may include a number of training rounds to conduct utilizing the ML model. In some aspects, the model information may include information regarding a configured measure of accuracy, which when achieved, the UE 120 may stop (e.g., complete) performing the BS-configured training procedure.

In some aspects, the model information may include reporting information having trigger information regarding when the UE 120 is to provide a report associated with performing the BS-configured training procedure. For instance, the model information may indicate (e.g., trigger) that the UE 120 is to provide the report periodically. Additionally, or alternatively, the model information may indicate that the UE 120 is to provide the report based at least in part on completing a configured number of training rounds (e.g., trigger) while achieving the configured measure of accuracy. In some aspects, the model information may include information regarding a method of providing the report. For instance, the model information may indicate that the UE 120 is to provide the report by transmitting the report to the BS 110. Alternatively, the model information may indicate that the UE 120 is to transmit an indication to the BS 110 when the UE 120 has completed performing the BS-configured training procedure and/or when the report is available. Based at least in part on receiving the indication, the BS 110 may initiate a UE information request procedure (e.g., trigger) to obtain the report from the UE 120.

In some aspects, when an amount of data included in the configuration information satisfies a threshold data level (e.g., the amount of data included in the configuration information is equal to or greater than the threshold data level), the BS 110 may utilize a dedicated radio bearer (DRB) or a special signaling radio bearer (SRB) to transmit the configuration information to the UE 120. When utilizing the DRB, the BS 110 may indicate a location (e.g., uniform resource identifier (URI)) where the configuration information is stored to enable the UE 120 to download the configuration information. Utilization of the DRB and/or the special SRB may allow the BS 110 to efficiently transmit the configuration information to the UE 120.

As shown by reference number 340, based at least in part on receiving the configuration information, the UE 120 may transmit, and the BS 110 may receive, a confirmation message to confirm receipt of the configuration information. In some aspects, the confirmation message may include an acceptance message to indicate consent from the UE 120 to perform the BS-configured training procedure. Alternatively, in some aspects, the confirmation message may include a rejection message to indicate that the UE 120 has declined to perform the BS-configured training procedure.

As shown by reference number 350, based at least in part on receiving the confirmation message from the UE 120, the BS 110 may transmit, and the OAM server 310 may receive, a response message indicating that the UE 120 has consented or declined to perform the BS-configured training procedure. When the UE 120 consents, the response message may inform the OAM server 310 that the server-requested training procedure, to be performed by the BS 110, may be based at least in part on the BS-configured training procedure to be performed by the UE 120.

As shown by reference number 360, based at least in part on the configuration information, the UE 120 may perform the BS-configured training procedure. In some aspects, performing the BS-configured training procedure may include utilizing an ML model to, for example, determine updated weights to update the initial weights. In some aspects, the UE 120 may use an internal processor (e.g., controller/processor 280) to utilize the ML model.

In some aspects, the UE 120 may provide data (e.g., known input data (X), initial weights, known output data (Y), supporting data, or the like) included in model information as training data to the ML model. In some aspects, the UE 120 may measure the supporting data associated with the initial parameters in real time and may provide the measured supporting data as training data to the ML model. In some aspects, the UE 120 may retrieve supporting data stored in an internal memory (e.g., memory 282) and provide the retrieved supporting data as training data to the ML model.

In some aspects, the UE 120 may utilize the ML model to process and/or evaluate the training data using an ML algorithm. The ML algorithm may evaluate the training data to determine a function associated with processing known input data (e.g., initial weights) to provide known output data. In some aspects, determining the function may include iteratively determining updated weights (to update the initial weights) associated with the function. For instance, in a first training round, the ML algorithm may determine first updated weights to update the initial weights, in a second training round, the ML algorithm may determine second updated weights to update the first updated weights, and so on. In some aspects, the ML algorithm may continue to iteratively determine the updated weights until a measure of accuracy associated with determining the function fails to satisfy a threshold error level (e.g., the measure of accuracy is equal to or greater than the threshold error level). In some aspects, the threshold error level may be the same as the previously discussed configured error level and may be preconfigured by the BS 110 or the OAM server 310.

As shown by reference number 370, the UE 120 may provide, and the BS 110 may receive, a report associated with performing the BS-configured training procedure. In some aspects, the report may include a result associated with performing the BS-configured training procedure. In some aspects, the report may include information related to the determined updated weights. In some aspects, as discussed previously, the UE 120 may provide the report based at least in part on information included in the model information.

As shown by reference number 380, based at least in part on receiving the report, the BS 110 may perform the server-requested training procedure. In some aspects, receiving the report may include receiving respective reports (including respective updated weights) from respective UEs having utilized respective model information to perform respective BS-configured training procedures. In some aspects, performing the server-configured training procedure may include utilizing a combination ML model to, for example, determine combination weights based at least in part on the respective updated weights (e.g., multi-UE averaging). In some aspects, the BS 110 may use an internal processor (e.g., controller/processor 240) to utilize the combination ML model.

In some aspects, the BS 110 may provide data (e.g., respective updated weights) included in the respective reports, received from the one or more UEs, as training data to the combination ML model. In some aspects, the BS 110 may provide, in addition to known input, known output, or the like, combination supporting data as training data. The combination supporting data may include information associated with network conditions that is applicable to the one or more UEs such as, for example, handover conditions, traffic conditions, interference conditions, coverage conditions, or the like as training data to the combination ML model. The supporting data may also include measured combination supporting data, measured by the BS 110 in real-time. In some aspects, the supporting data may include retrieved combination supporting data, retrieved by the BS 110 from an internal memory (e.g., memory 242).

In some aspects, the BS 110 may utilize the combination ML model to process the training data using a combination machine learning algorithm (ML algorithm). The combination ML algorithm may evaluate the training data to determine a combination function associated with processing known input data (e.g., X, respective updated weights) to provide known output data (e.g., Y). In some aspects, determining the combination function may include iteratively determining combination updated weights (to update the respective updated weights). For instance, in a first training round, the combination ML algorithm may determine first combination updated weights to update the respective updated weights, in a second training round, the combination ML algorithm may determine second combination updated weights to update the first combination updated weights, and so on. In some aspects, the combination ML algorithm may continue to iteratively determine the combination updated weights until a measure of accuracy associated with determining the combination function fails to satisfy a threshold combination error level (e.g., the measure of accuracy is equal to or greater than the combination threshold error level). For instance, the BS 110 may utilize the mean square error method $$\left(MSE = \sum_{n=1}^{N} |Y - f(X)|^2\right)$$

to verify whether the measure of accuracy associated with determining the combination updated weights fails to satisfy the threshold combination error level. In some aspects, the threshold combination error level may be preconfigured by the OAM server 310.

In some aspects, the BS 110 may utilize a least square method and/or a gradient method to determine the combination updated weights expeditiously. In some aspects, the BS 110 may utilize the combination ML model to determine the combination updated weights based at least in part on the requested geographical area, the requested measure of accuracy, the requested number of training samples to be collected and processed, the requested location information, and/or the requested time frame associated with collecting and processing the data.

As shown by reference number 390, the BS 110 may provide a result associated with performing the server-requested training procedure to the OAM server 310. In some aspects, the result may include information associated with the determined combined updated weights. Based at least in part on receiving the result from the BS 110, the OAM server 310 may postprocess information included in the result to improve the network performance. For instance, with respect to providing positioning services to the one or more UEs, the OAM server 310 may utilize the information associated with the combined updated weights to, for example, improve an accuracy associated with determining and providing location information to the one or more UEs.

Utilizing the network-configured training procedure, as discussed herein, may enable a network provider to improve network performance of a network including a plurality of UEs conducting data communication with a plurality of BSs. In some aspects, distributed processing of the data by the plurality of UEs and the plurality of BSs may yield results that the network provider may use to improve the network performance without the network provider having to undertake infeasible and expensive collection of data. In this way, the network-configured training procedure may enable a convenient and cost-effective way to improve the network performance.

As indicated above, FIG. 3 is provided as an example. Other examples may differ from what is described with regard to FIG. 3.

Figure 4:
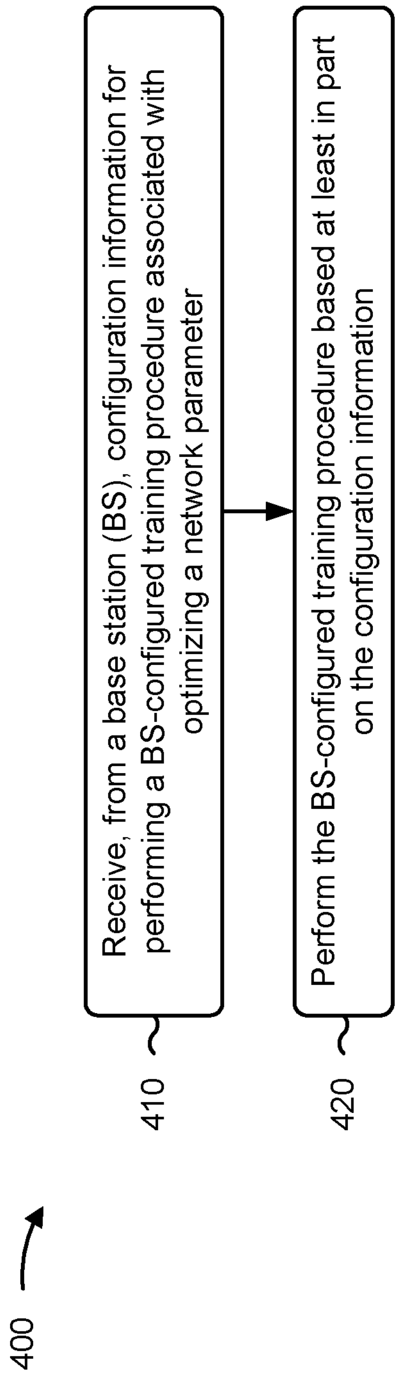
FIGS. 4 and 5 are diagrams illustrating example processes associated with a network-configured training procedure, in accordance with various aspects of the present disclosure.

FIG. 4 is a diagram illustrating an example process 400 performed, for example, by a UE (e.g., UE 120), in accordance with various aspects of the present disclosure. Example process 400 is an example where the UE performs operations associated with a network-configured training procedure.

As shown in FIG. 4, in some aspects, process 400 may include receiving, from a base station, configuration information for performing a BS-configured training procedure associated with optimizing a network parameter (block 410). For example, the UE (e.g., using reception component 602, depicted in FIG. 6) may receive, from a base station, configuration information for performing a BS-configured training procedure associated with optimizing a network parameter, as described above.

As further shown in FIG. 4, in some aspects, process 400 may include performing the BS-configured training procedure based at least in part on the configuration information (block 420). For example, the UE (e.g., using performing component 608, depicted in FIG. 6) may perform the BS-configured training procedure based at least in part on the configuration information, as described above.

Process 400 may include additional aspects, such as any single aspect or any combination of aspects described below and/or in connection with one or more other processes described elsewhere herein.

In a first aspect, performing the BS-configured training procedure includes performing the BS-configured training procedure utilizing a machine learning algorithm.

In a second aspect, alone or in combination with the first aspect, receiving the configuration information includes receiving model information associated with performing the BS-configured training procedure.

In a third aspect, alone or in combination with one or more of the first and second aspects, the model information includes information related to one or more initial parameters to be utilized while performing the BS-configured training procedure.

In a fourth aspect, alone or in combination with one or more of the first through third aspects, the model information includes information related to performing an action while performing the BS-configured training procedure.

In a fifth aspect, alone or in combination with one or more of the first through fourth aspects, the model information includes information related to a geographical area associated with performing the BS-configured training procedure.

In a sixth aspect, alone or in combination with one or more of the first through fifth aspects, the model information includes information related to starting or stopping performance of the BS-configured training procedure.

In a seventh aspect, alone or in combination with one or more of the first through sixth aspects, the model information includes information related to providing a report associated with performing the BS-configured training procedure.

In an eighth aspect, alone or in combination with one or more of the first through seventh aspects, receiving the configuration information includes utilizing a dedicated radio bearer or a signaling radio bearer to receive the configuration information when an amount of data included in the configuration information satisfies a threshold data level.

In a ninth aspect, alone or in combination with one or more of the first through eighth aspects, process 400 includes providing, to the base station, a report associated with performing the BS-configured training procedure based at least in part on receiving a trigger or a request to provide the report.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
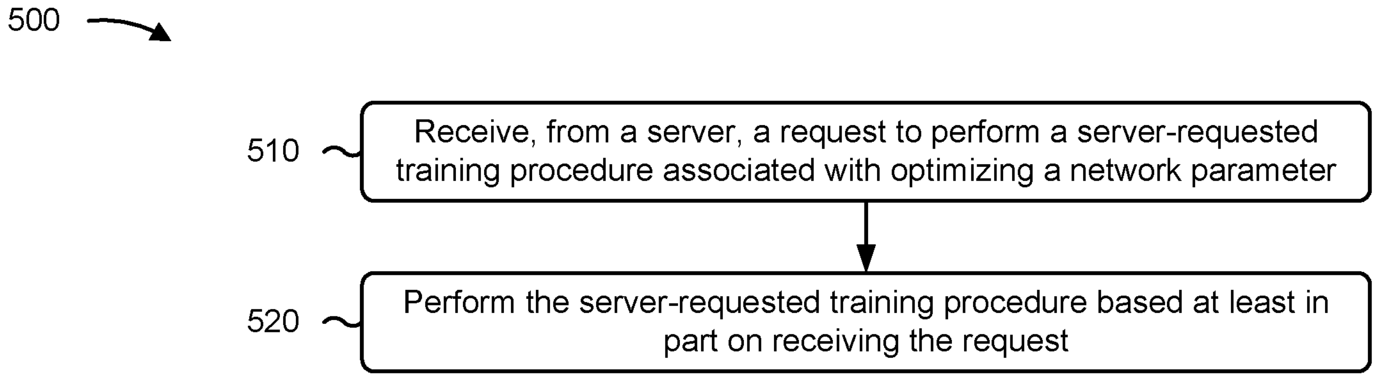

FIG. 5 is a diagram illustrating an example process 500 performed, for example, by a base station (e.g., BS 110), in accordance with various aspects of the present disclosure. Example process 500 is an example where the base station performs operations associated with a network-configured training procedure.

As shown in FIG. 5, in some aspects, process 500 may include receiving, from a server, a request to perform a server-requested training procedure associated with optimizing a network parameter (block 510). For example, the base station (e.g., using reception component 702, depicted in FIG. 7) may receive, from a server, a request to perform a server-requested training procedure associated with optimizing a network parameter, as described above.

As further shown in FIG. 5, in some aspects, process 500 may include performing the server-requested training procedure based at least in part on receiving the request (block 520). For example, the base station (e.g., using performing component 708, depicted in FIG. 7) may perform the server-requested training procedure based at least in part on receiving the request, as described above.

Process 500 may include additional aspects, such as any single aspect or any combination of aspects described below and/or in connection with one or more other processes described elsewhere herein.

In a first aspect, process 500 includes transmitting, to the server, a result associated with performing the server-requested training procedure.

In a second aspect, alone or in combination with the first aspect, performing the server-requested training procedure includes performing the server-requested training procedure utilizing a machine learning algorithm.

In a third aspect, alone or in combination with one or more of the first and second aspects, process 500 includes transmitting, to a UE, configuration information associated with performing a BS-configured training procedure based at least in part on a capability of the UE to perform the BS-configured training procedure.

In a fourth aspect, alone or in combination with one or more of the first through third aspects, performing the server-requested training procedure includes updating a parameter associated with performing the server-requested training procedure based at least in part on a received report associated with performing a B S-configured training procedure by a user equipment.

In a fifth aspect, alone or in combination with one or more of the first through fourth aspects, performing the server-requested training procedure includes performing the server-requested training procedure based at least in part on a measure of accuracy associated with performing the server-requested training procedure.

In a sixth aspect, alone or in combination with one or more of the first through fifth aspects, performing the server-requested training procedure includes performing the server-requested training procedure based at least in part on a number of training samples associated with performing the server-requested training procedure.

In a seventh aspect, alone or in combination with one or more of the first through sixth aspects, process 500 includes transmitting, to one or more user equipments (UEs), respective configuration information associated with performing respective BS-configured training procedures, and receiving, from the one or more UEs, respective reports associated with performing the respective BS-configured training procedures.

In an eighth aspect, alone or in combination with one or more of the first through seventh aspects, transmitting the respective configuration information includes transmitting, to the one or more UEs, respective model information associated with performing the respective BS-configured training procedures.

In a ninth aspect, alone or in combination with one or more of the first through eighth aspects, performing the server-requested training procedure includes averaging one or more results included in the respective reports.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
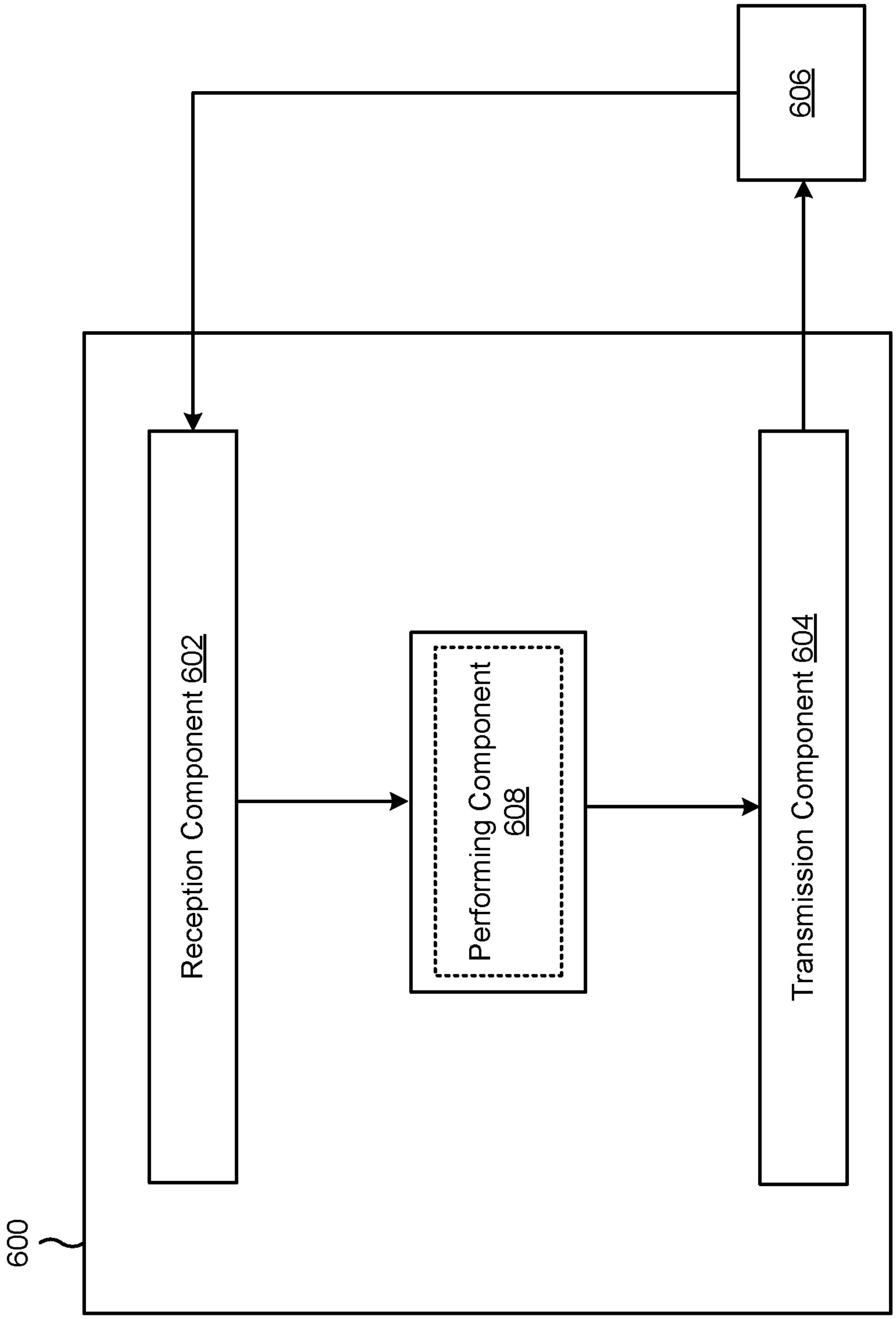
FIGS. 6 and 7 are diagrams of example apparatuses associated with a network-configured training procedure, in accordance with various aspects of the present disclosure.

FIG. 6 is a block diagram of an example apparatus 600 for wireless communication (e.g., training a model utilized for wireless communication). The apparatus 600 may be a UE (e.g., UE 120), or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a performing component 608, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, from a base station, configuration information for performing a BS-configured training procedure associated with optimizing a network parameter. The performing component 608 may perform the B S-configured training procedure based at least in part on the configuration information.

The performing component 608 may provide, to the base station, a report associated with performing the BS-configured training procedure based at least in part on receiving a trigger or a request to provide the report.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
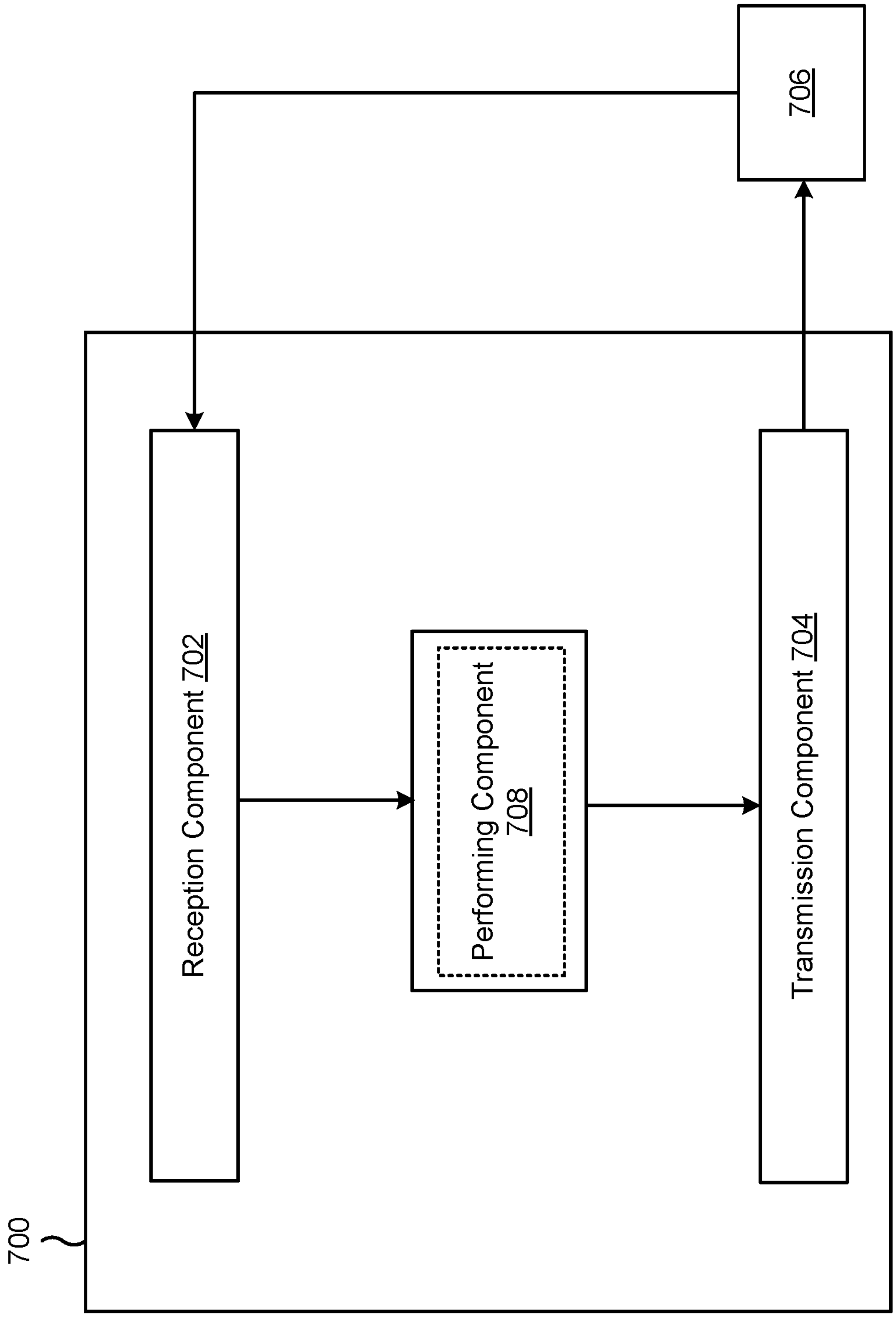

FIG. 7 is a block diagram of an example apparatus 700 for wireless communication. The apparatus 700 may be a base station (e.g., BS 110), or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a performing component 708, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station (e.g., BS 110) described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station (e.g., BS 110) described above in connection with FIG. 2. In some aspects, the transmission component 704 may be co-located with the reception component 702 in a transceiver.

The reception component 702 may receive, from a server, a request to perform a server-requested training procedure associated with optimizing a network parameter. The performing component 708 may perform the server-requested training procedure based at least in part on receiving the request.

The transmission component 704 may transmit, to the server, a result associated with performing the server-requested training procedure.

The transmission component 704 may transmit, to a UE, configuration information associated with performing a BS-configured training procedure based at least in part on a capability of the UE to perform the BS-configured training procedure.

The transmission component 704 may transmit, to one or more UEs, respective configuration information associated with performing respective BS-configured training procedures.

The reception component 702 may receive, from the one or more UEs, respective reports associated with performing the respective BS-configured training procedures.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The Following Provides an Overview of Aspects of the Present Disclosure:

Aspect 1: A method training a model performed by a UE, comprising receiving, from a base station, configuration information for performing a BS-configured training procedure associated with optimizing a network parameter; and performing the BS-configured training procedure based at least in part on the configuration information.

Aspect 2: The method of aspect 1, wherein performing the BS-configured training procedure includes performing the BS-configured training procedure utilizing a machine learning algorithm.

Aspect 3: The method of aspects 1 through 2, wherein receiving the configuration information includes receiving model information associated with performing the BS-configured training procedure.

Aspect 4: The method of any of aspects 1 through 3, wherein the model information includes information related to one or more initial parameters to be utilized while performing the BS-configured training procedure.

Aspect 5: The method of any of aspects 1 through 4, wherein the model information includes information related to performing an action while performing the BS-configured training procedure.

Aspect 6: The method of any of aspects 1 through 5, wherein the model information includes information related to a geographical area associated with performing the BS-configured training procedure.

Aspect 7: The method of any of aspects 1 through 6, wherein the model information includes information related to starting or stopping performance of the BS-configured training procedure.

Aspect 8: The method of any of aspects 1 through 7, wherein the model information includes information related to providing a report associated with performing the BS-configured training procedure.

Aspect 9: The method of any of aspects 1 through 8, wherein receiving the configuration information includes utilizing a dedicated radio bearer or a signaling radio bearer to receive the configuration information when an amount of data included in the configuration information satisfies a threshold data level.

Aspect 10: The method of any of aspects 1 through 9, further comprising providing, to the base station, a report associated with performing the BS-configured training procedure based at least in part on receiving a trigger or a request to provide the report.

Aspect 11: A method of wireless communication performed by a base station, comprising receiving, from a server, a request to perform a server-requested training procedure associated with optimizing a network parameter; and performing the server-requested training procedure based at least in part on receiving the request.

Aspect 12: The method of aspect 11, further comprising transmitting, to the server, a result associated with performing the server-requested training procedure.

Aspect 13: The method of any of aspects 11 and 12, wherein performing the server-requested training procedure includes performing the server-requested training procedure utilizing a machine learning algorithm.

Aspect 14: The method of any of aspects 11 through 13, further comprising transmitting, to a UE, configuration information associated with performing a BS-configured training procedure based at least in part on a capability of the UE to perform the BS-configured training procedure.

Aspect 15: The method of any of aspects 11 through 14, wherein performing the server-requested training procedure includes updating a parameter associated with performing the server-requested training procedure based at least in part on a received report associated with performing a BS-configured training procedure by a user equipment.

Aspect 16: The method of any of aspects 11 through 15, wherein performing the server-requested training procedure includes performing the server-requested training procedure based at least in part on a measure of accuracy associated with performing the server-requested training procedure.

Aspect 17: The method of any of aspects 11 through 16, wherein performing the server-requested training procedure includes performing the server-requested training procedure based at least in part on a number of training samples associated with performing the server-requested training procedure.

Aspect 18: The method of any of aspects 11 through 17, further comprising transmitting, to one or more user equipments (UEs), respective configuration information associated with performing respective BS-configured training procedures; and receiving, from the one or more UEs, respective reports associated with performing the respective BS-configured training procedures.

Aspect 19: The method of any of aspects 11 through 18, wherein transmitting the respective configuration information includes transmitting, to the one or more UEs, respective model information associated with performing the respective BS-configured training procedures.

Aspect 20: the method of any of aspects 11 through 19, wherein performing the server-requested training procedure includes averaging one or more results included in the respective reports.

Aspect 21: An apparatus for wireless communication at a first device, comprising a processor; memory coupled with the processor; and instructions stored in the memory and executable by the processor to cause the apparatus to perform a method of any of aspects 1 through 10.

Aspect 22: A user equipment for wireless communication, comprising a memory and one or more processors coupled to the memory, the memory and the one or more processors configured to perform a method of any of aspects 1 through 10.

Aspect 23: An apparatus for wireless communication, comprising at least one means for performing a method of any of aspects 1 through 10.

Aspect 24: A non-transitory computer-readable medium storing code for wireless communication, the code comprising instructions executable by a processor to perform a method of any of aspects 1 through 10.

Aspect 25: A non-transitory computer-readable medium storing one or more instructions for wireless communication, the one or more instructions comprising one or more instructions that, when executed by one or more processors of a user equipment, cause the one or more processors to perform a method of any of aspects 1 through 10.

Aspect 26: An apparatus for wireless communication at a second device, comprising a processor; memory coupled with the processor; and instructions stored in the memory and executable by the processor to cause the apparatus to perform a method of any of aspects 11 through 20.

Aspect 27: A base station for wireless communication, comprising a memory and one or more processors coupled to the memory, the memory and the one or more processors configured to perform a method of any of aspects 11 through 20.

Aspect 28: An apparatus for wireless communication, comprising at least one means for performing a method of any of aspects 11 through 20.

Aspect 29: A non-transitory computer-readable medium storing code for wireless communication, the code comprising instructions executable by a processor to perform a method of any of aspects 11 through 20.

Aspect 30: A non-transitory computer-readable medium storing one or more instructions for wireless communication, the one or more instructions comprising one or more instructions that, when executed by one or more processors of a base station, cause the one or more processors to perform a method of any of aspects 11 through 20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of training a model performed by a user equipment (UE), comprising:

providing, to a network node and while establishing a connection with the network node or while signing up to obtain services from a network provider, consent information to perform a network node-configured training procedure associated with optimizing a network parameter;

receiving, from the network node and based at least in part on providing the consent information, configuration information for performing the network node-configured training procedure, wherein the configuration information includes:

information related to performing a positioning service by the UE while performing the network node-configured training procedure, and model information, associated with performing the network node-configured training procedure, including:

a time when the UE is to start a performance of the network node-configured training procedure, information indicating the UE is to stop the performance of the network node-configured training procedure when the UE achieves a configured error level associated with the model, a quantity of training rounds to conduct utilizing the model, information related to a method to be used to verify a measure of accuracy with respect to the configured error level, information indicating that the UE is to update initial weights associated with one or more training layers of a machine learning model when the measure of accuracy fails to satisfy the configured error level, and reporting information indicating that the UE is to provide a report associated with performing the network node-configured training procedure based at least in part on completing the quantity of training rounds and achieving the measure of accuracy; and performing the network node-configured training procedure based at least in part on the configuration information.

2. The method of claim 1, wherein performing the network node-configured training procedure includes utilizing a machine learning algorithm to iteratively determine the updated initial weights, and utilizing a means squared error method to verity that the measure of accuracy satisfies the configured error level.

3. The method of claim 1, wherein performing the network node-configured training procedure includes fitting model parameters into a machine learning algorithm based at least in part on local model input data and local model output data.

4. The method of claim 1, wherein the model information further includes information related to one or more initial parameters to be utilized while performing the network node-configured training procedure, the one or more initial parameters comprising a model definition including a node list for the one or more training layers and the initial weights.

5. The method of claim 1, wherein the model information includes information related to an area associated with performing the network node-configured training procedure, wherein the area is within a cell being served by the network node.

6. The method of claim 1, wherein receiving the configuration information includes utilizing a dedicated radio bearer to receive the configuration information when an amount of data included in the configuration information satisfies a threshold data level.

7. The method of claim 1, further comprising:

providing, to the network node, the report based at least in part on completing the quantity of training rounds while achieving the measure of accuracy.

8. A method of wireless communication performed by a network node, comprising:

receiving, from a server, a request to perform a server-requested training procedure associated with optimizing a network parameter, wherein the request indicates that a user equipment (UE) has provided consent to perform the server-requested training procedure;

transmitting, to the UE, based at least in part on receiving the request, and further based at least in part on a capability of the UE in utilizing a machine learning algorithm to perform a network node-configured training procedure, configuration information associated with performing the network node-configured training procedure different from the server-requested training procedure, wherein the configuration information includes:

information related to performing a positioning service by the UE while performing the network node-configured training procedure, and model information, associated with performing the network node-configured training procedure, including:

a time when the UE is to start a performance of the network node-configured training procedure, information indicating that the UE is to stop the performance of the network node-configured training procedure when the UE achieves a configured error level associated with the model, a quantity of training rounds to conduct utilizing the model, information related to a method to be used to verify a measure of accuracy with respect to the configured error level, information indicating that the UE is to update initial weights associated with one or more training layers of a machine learning model when the measure of accuracy fails to satisfy the configured error level, and reporting information indicating that the UE is to provide a report associated with performing the network node-configured training procedure based at least in part on completing the quantity of training rounds and achieving the measure of accuracy;

receiving, from the UE and based at least in part on transmitting the configuration information, the report associated with performing the network node-configured training procedure utilizing the machine learning algorithm; and performing the server-requested training procedure based at least in part on receiving the report.

9. The method of claim 8, further comprising:

transmitting, to the server, a result associated with performing the server-requested training procedure.

10. The method of claim 8, wherein the capability of the UE comprises a processing capacity, a hardware acceleration capacity, and a memory space.

11. The method of claim 8, wherein performing the server-requested training procedure includes updating a parameter, different than the network parameter and associated with performing the server-requested training procedure, based at least in part on the report.

12. The method of claim 8, wherein performing the server-requested training procedure includes performing the server-requested training procedure based at least in part on the measure of accuracy associated with performing the server-requested training procedure.

13. The method of claim 8, wherein performing the server-requested training procedure includes performing the server-requested training procedure based at least in part on a number of training samples associated with performing the server-requested training procedure.

14. The method of claim 8, further comprising:

performing, based at least in part on transmitting the configuration information, a UE information request procedure to receive the report.

15. The method of claim 8, further comprising:

transmitting, to another UE, additional configuration information associated with performing another network node-configured training procedure; and receiving, from the other UE, another report associated with performing the other network node-configured training procedure, wherein performing the server-requested training procedure is further based at least in part on the report and the other report.

16. The method of claim 15, wherein performing the server-requested training procedure includes averaging one or more results included in the report and the other report.

17. A user equipment (UE) for wireless communication, comprising:

one or more memories; and one or more processors coupled to the one or more memories, the one or more processors configured to:

provide, to a network node and while establishing a connection with the network node or while signing up to obtain services from a network provider, consent information to perform a network node-configured training procedure associated with optimizing a network parameter;

receive, from the network node, configuration information for performing the network node-configured training procedure, wherein the configuration information includes:

information related to performing a positioning service by the UE while performing the network node-configured training procedure, and model information, associated with performing the network node-configured training procedure, including:

a time when the UE is to start a performance of the network node-configured training procedure, information indicating the UE is to stop the performance of the network node-configured training procedure when the UE achieves a configured error level associated with the model, a quantity of training rounds to conduct utilizing the model, information related to a method to be used to verify a measure of accuracy with respect to the configured error level, information indicating that the UE is to update initial weights associated with one or more training layers of a machine learning model when the measure of accuracy fails to satisfy the configured error level, and reporting information indicating that the UE is to provide a report associated with performing the network node-configured training procedure based at least in part on completing the quantity of training rounds and achieving the measure of accuracy; and perform the network node-configured training procedure based at least in part on the configuration information.

18. The UE of claim 17, wherein the one or more processors, to perform the network node-configured training procedure, are configured utilizing a machine learning algorithm to iteratively determine the updated initial weights, and utilizing a means squared error method to verity that the measure of accuracy satisfies the configured error level.

19. A network node for wireless communication, comprising:

one or more memories; and one or more processors coupled to the one or more memories, the one or more processors configured to:

receive, from a server, a request to perform a server-requested training procedure associated with optimizing a network parameter;

receive, from a user equipment (UE) and based at least in part on receiving the request, consent information to perform the server-requested training procedure;

transmit, to the UE, based at least in part on receiving the consent information, and further based at least in part on a capability of the UE in utilizing a machine learning algorithm to perform a network node-configured training procedure, configuration information associated with performing the network node-configured training procedure different from the server-requested training procedure, wherein the configuration information includes:

information related to performing a positioning service by the UE while performing the network node-configured training procedure, and model information, associated with performing the network node-configured training procedure, including:

a time when the UE is to start a performance of the network node-configured training procedure, information indicating that the UE is to stop the performance of the network node-configured training procedure when the UE achieves a configured error level associated with the model, a quantity of training rounds to conduct utilizing the model, information related to a method to be used to verify a measure of accuracy with respect to the configured error level, information indicating that the UE is to update initial weights associated with one or more training layers of a machine learning model when the measure of accuracy fails to satisfy the configured error level, and reporting information indicating that the UE is to provide a report associated with performing the network node-configured training procedure based at least in part on completing the quantity of training rounds and achieving the measure of accuracy;

receive, from the UE and based at least in part on transmitting the configuration information, the report associated with performing the network node-configured training procedure utilizing the machine learning algorithm; and perform the server-requested training procedure based at least in part on receiving the report.

20. The network node of claim 19, wherein the one or more processors are further configured to:

transmit, to the server, a result associated with performing the server-requested training procedure.

21. The network node of claim 19, wherein the one or more processors, to perform the server-requested training procedure, are configured to perform the server-requested training procedure utilizing the machine learning algorithm.

22. The network node of claim 19, wherein the capability of the UE comprises a processing capacity, a hardware acceleration capacity, and a memory space.

23. The network node of claim 19, wherein the one or more processors, to perform the server-requested training procedure, are configured to update a parameter associated with performing the server-requested training procedure based at least in part on the report.

24. The UE of claim 17, wherein the report associated with performing the training procedure includes at least one of:

updated weights associated with the model, gradient information associated with the model, a number of training samples used during the training procedure, location information of the UE, or a timestamp associated with performing the training procedure.

25. The UE of claim 17, wherein the one or more processors are configured to:

transmit, from the UE and after receiving the configuration information, a confirmation message indicating that the UE has accepted or rejected the configuration information associated with performing the training procedure.

26. The UE of claim 17, wherein the one or more processors, to perform the network node-configured training procedure, are configured to fit model parameters into a machine learning algorithm based at least in part on local model input data and local model output data.

27. The UE of claim 17, wherein the model information further includes information related to one or more initial parameters to be utilized while performing the network node-configured training procedure, the one or more initial parameters comprising a model definition including a node list for the one or more training layers and the initial weights.

28. The UE of claim 17, wherein the model information includes information related to an area associated with performing the network node-configured training procedure, wherein the area is within a cell being served by the network node.

29. The UE of claim 17, wherein the one or more processors, to receive the configuration information, are configured to utilize a dedicated radio bearer to receive the configuration information when an amount of data included in the configuration information satisfies a threshold data level.

30. The UE of claim 17, wherein the one or more processors are further configured to:

provide, to the network node, the report based at least in part on completing the quantity of training rounds while achieving the measure of accuracy.

* * * * *